(12) United States Patent
Wernersson

(10) Patent No.: US 8,988,507 B2
(45) Date of Patent: Mar. 24, 2015

(54) USER INTERFACE FOR AUTOFOCUS

(75) Inventor: Mats Wernersson, Helsingborg (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 586 days.

(21) Appl. No.: 12/621,852

(22) Filed: Nov. 19, 2009

(65) Prior Publication Data

US 2011/0115885 A1    May 19, 2011

(51) Int. Cl.
| | | |
|---|---|---|
| H04N 13/02 | (2006.01) | |
| H04N 5/232 | (2006.01) | |
| H04N 5/225 | (2006.01) | |
| H04N 13/04 | (2006.01) | |
| G06F 3/0481 | (2013.01) | |
| G06F 3/0489 | (2013.01) | |

(Continued)

(52) U.S. Cl.
CPC ........ *H04N 5/23212* (2013.01); *G06F 3/04812* (2013.01); *G06F 3/04892* (2013.01); *G03B 3/00* (2013.01); *G05B 2219/13055* (2013.01); *H04M 1/72522* (2013.01); *H04M 2250/52* (2013.01); *H04N 5/2256* (2013.01); *H04N 5/23293* (2013.01); *H04N 13/0239* (2013.01); *H04N 13/0285* (2013.01); *H04N 13/04* (2013.01); *H04N 13/0402* (2013.01); *H04N 13/0452* (2013.01); *H04N 2007/145* (2013.01)
USPC .................... 348/47; 396/48; 396/79; 396/89

(58) Field of Classification Search
CPC . G06F 3/04815; G06F 3/0304; G06F 3/0346; G06F 3/038; G06F 2203/04806; G06F 3/04812; G06F 3/04892; H04N 13/0242; H04N 13/0239; H04N 5/232; H04N 5/23212; H04N 5/23293; G06K 2209/40; G06T 2207/10012; G06T 17/00; G06T 7/0022; G06T 19/00; G02B 15/161; G02B 27/22; G02B 27/2228; G05B 2219/35496; G05B 2219/36331; G05B 2219/13055
USPC ...................................................... 348/42–60
See application file for complete search history.

(56) References Cited

U.S. PATENT DOCUMENTS 5,504,547 A * 4/1996 Mizukawa .................... 396/378
6,201,517 B1 * 3/2001 Sato ................................ 345/7

(Continued)

FOREIGN PATENT DOCUMENTS

JP    2009171301 A *  7/2009

OTHER PUBLICATIONS

Zhai, S.; Buxton, W.; Milgram, P., "The "Silk Cursor": investigating transparency for 3D target acquisition" CHI '94 Proceedings of the SIGCHI Conference on Human Factors in Computing Systems. Apr. 24-28, 1994. pp. 459-464.*

(Continued)

*Primary Examiner* — Dave Czekaj
*Assistant Examiner* — Tyler W Sullivan
(74) *Attorney, Agent, or Firm* — Snyder, Clark, Lesch & Chung, LLP

(57) ABSTRACT

A camera includes a lens assembly and a stereoscopic display for displaying an image captured by the camera, and automatically determines a correct focus for the camera using the stereoscopic display to show an icon on the image appearing to move perpendicularly, relative to a first plane corresponding to a surface of the stereoscopic display, from different perceived depths corresponding to different planes parallel to the first plane.

17 Claims, 11 Drawing Sheets

(51) Int. Cl.
*G03B 3/00* (2006.01)
*H04M 1/725* (2006.01)
*H04N 7/14* (2006.01)

(56) References Cited

U.S. PATENT DOCUMENTS

| | | | |
|---|---|---|---|
| 7,433,586 B2* | 10/2008 | Onozawa | 396/121 |
| 7,616,885 B2* | 11/2009 | Chen et al. | 396/324 |
| 7,724,208 B1* | 5/2010 | Engel et al. | 345/4 |
| 7,791,669 B2* | 9/2010 | Nonaka | 348/349 |
| 7,956,819 B2* | 6/2011 | Tomisawa et al. | 345/1.1 |
| 8,314,832 B2* | 11/2012 | Mann et al. | 348/51 |
| 2004/0233222 A1* | 11/2004 | Lee et al. | 345/621 |
| 2005/0104992 A1 | 5/2005 | Aoyama et al. | |
| 2005/0207486 A1 | 9/2005 | Lee et al. | |
| 2006/0055814 A1 | 3/2006 | Okawa et al. | |
| 2006/0204239 A1 | 9/2006 | Inaba | |
| 2007/0296809 A1* | 12/2007 | Newbery | 348/42 |
| 2008/0118156 A1 | 5/2008 | Okada | |
| 2008/0158346 A1* | 7/2008 | Okamoto et al. | 348/47 |
| 2009/0228841 A1* | 9/2009 | Hildreth | 715/863 |
| 2010/0091012 A1* | 4/2010 | Newton et al. | 345/419 |
| 2011/0032329 A1* | 2/2011 | Bauza et al. | 348/43 |

OTHER PUBLICATIONS

Wickens, Christopher D. ; Todd, Steven ; Seidler, Karen, "Three-Dimensional Displays: Perception, Implementation, and Applications", DTIC, Oct. 1989.*
International Search Report and Written Opinion dated Jan. 31, 2011 issued in corresponding PCT application No. PCT/IB2010/054669, 15 pages.

* cited by examiner

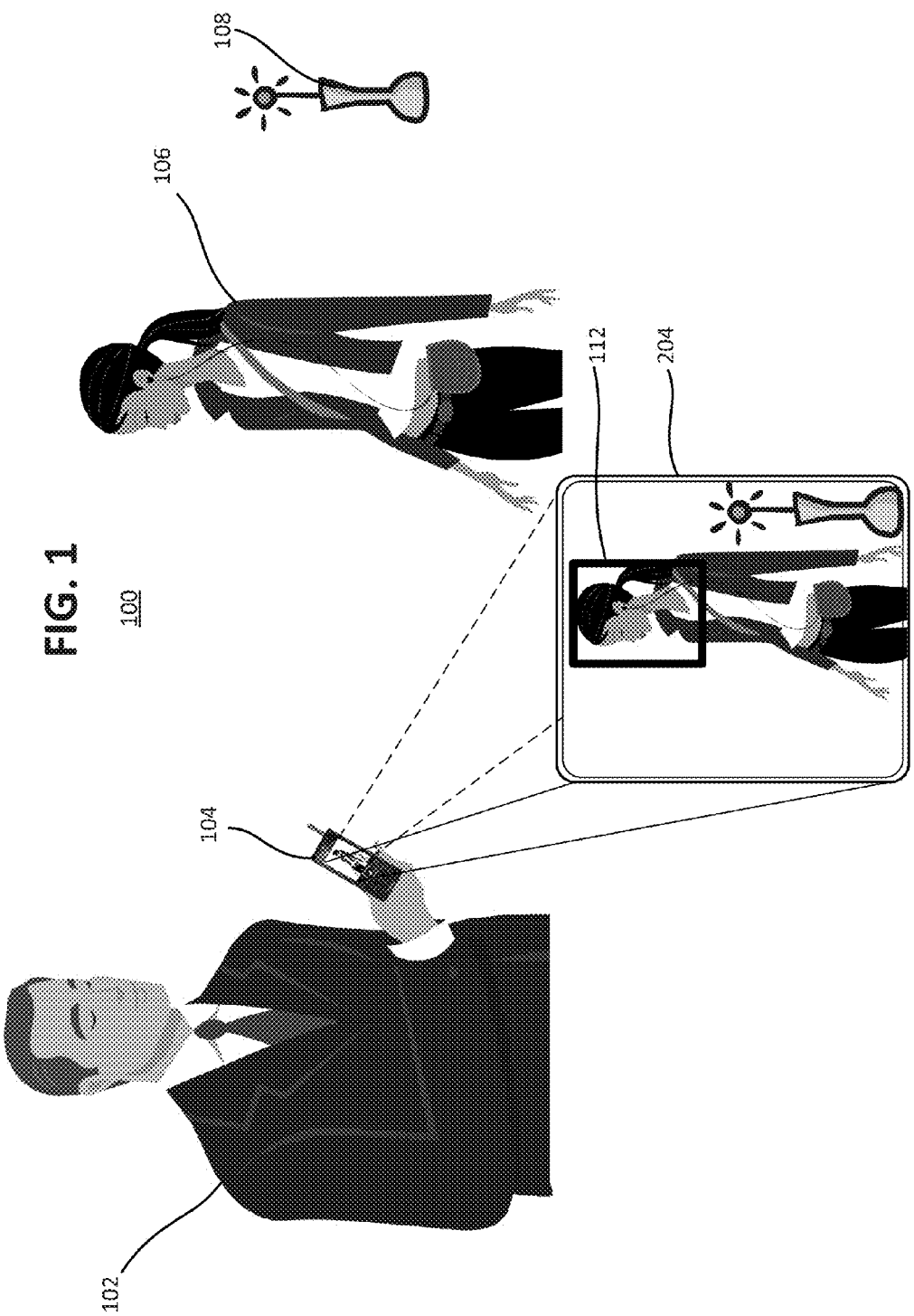

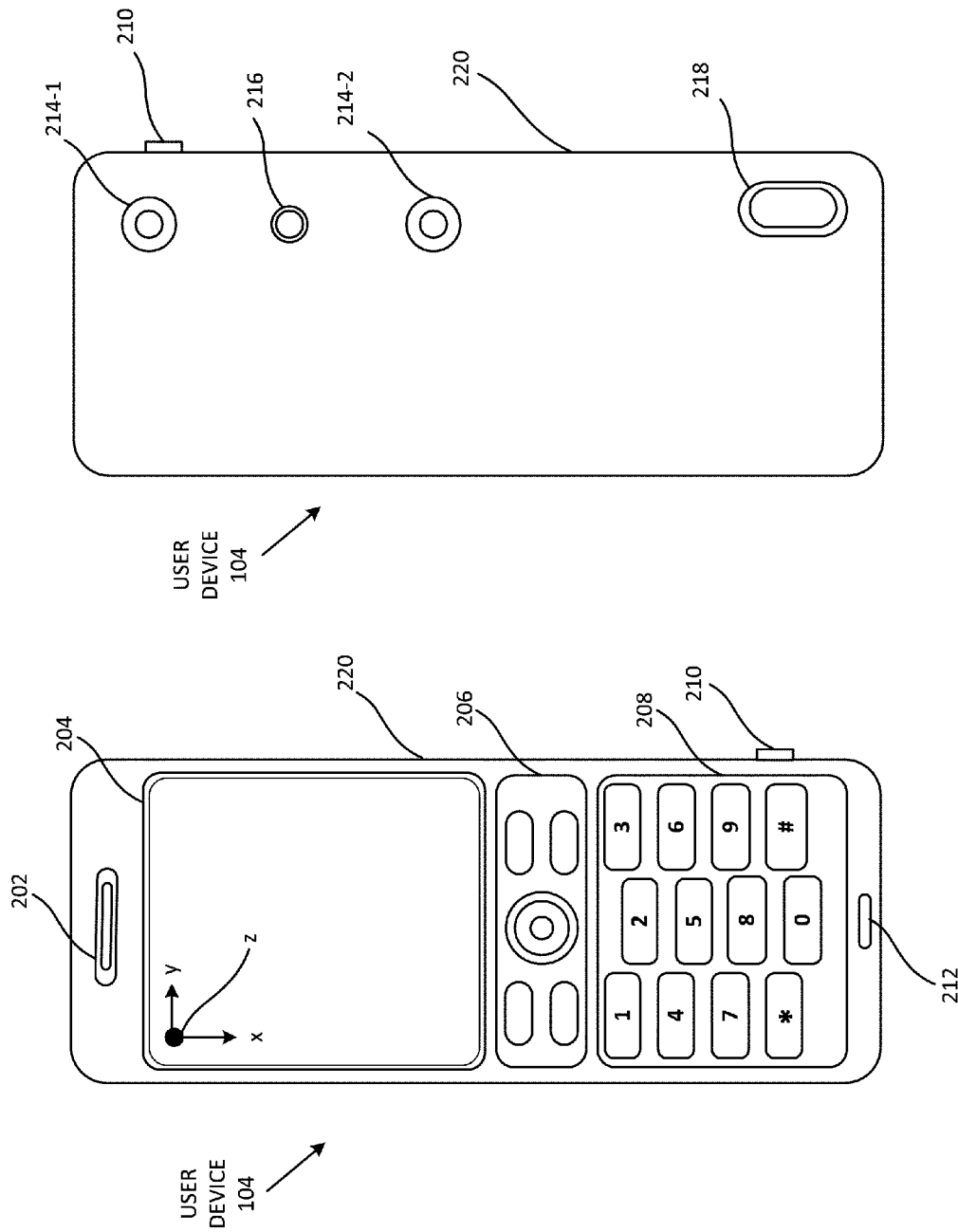

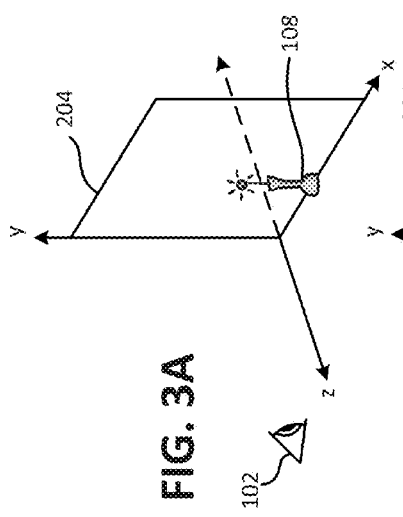
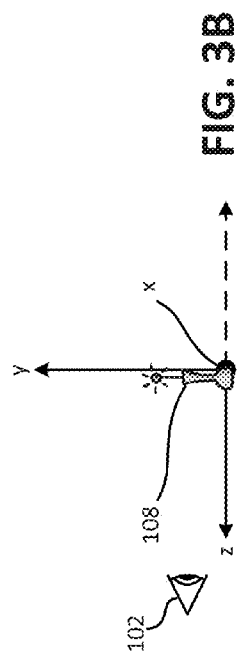
FIG. 3A
FIG. 3B
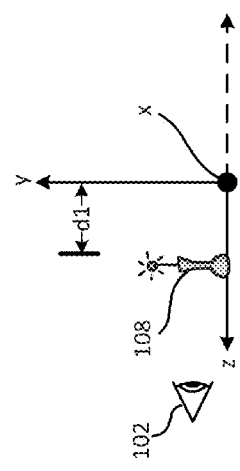
FIG. 3C
FIG. 3D
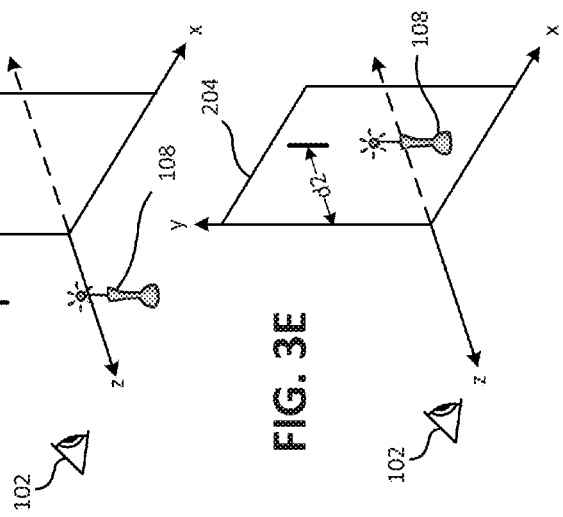
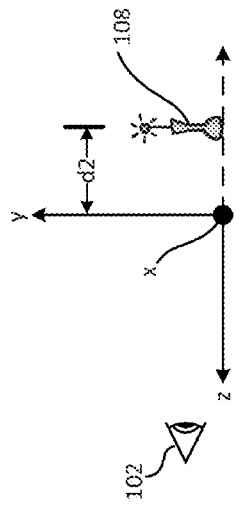
FIG. 3E
FIG. 3F

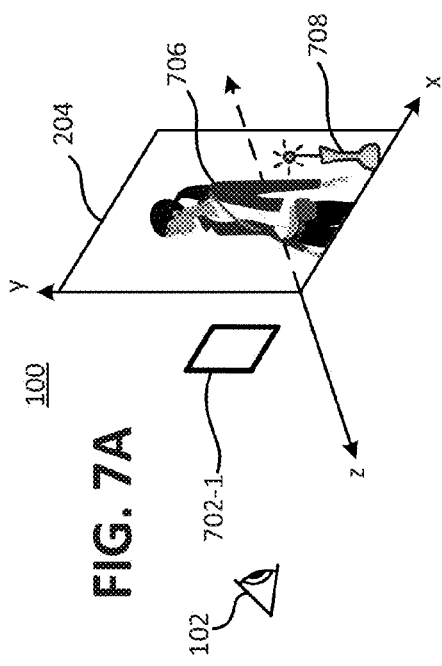
FIG. 7A
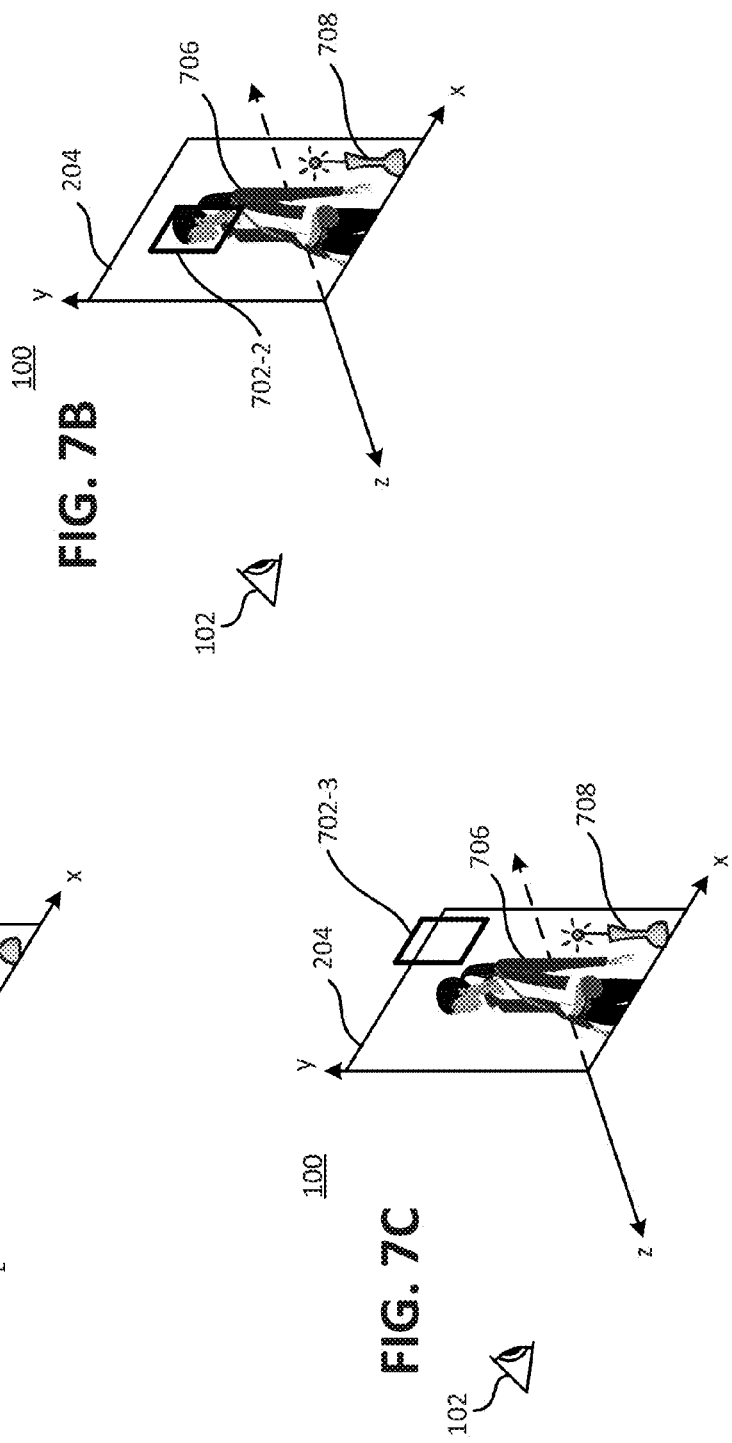
FIG. 7B
FIG. 7C

USER INTERFACE FOR AUTOFOCUS

BACKGROUND

Some mobile phones include cameras for capturing images. Further, some of these mobile phones with cameras (and some stand-alone cameras) may include stereoscopic or autostereoscopic displays. Stereoscopic and autostereoscopic displays can display three-dimensional (3D) images to a user. While a stereoscopic display may require headgear or glasses, an autostereoscopic display does not.

Different technologies exist for autostereoscopic displays, including lenticular lenses, conoscopic lenses, or parallax barriers. A lenticular lens may include an array of magnifying lenses designed so that when viewed from slightly different angles, different images are magnified. Thus, a lenticular lens may provide a different image to each eye, providing a 3D image and allowing a user to perceive depth. Like lenticular lenses, conoscopic lenses may also provide a different image to each eye, providing the 3D image and allowing the user to perceive depth. A parallax barrier includes a series of precision slits, that, when placed in front of an LCD screen, for example, may allow each eye to see a different set of pixels. Thus, a parallax barrier may also provide a different image to each eye, providing the 3D image and allowing the user to perceive depth.

SUMMARY

In one aspect, a device may include a camera including a lens assembly. The device may also include a stereoscopic display for displaying an image to be captured by the camera. The device may also include processing logic to automatically determine a correct focus for the camera, wherein, when the processing logic is determining the correct focus, the stereoscopic display shows an icon on the image moving from a first perceived depth to a second perceived depth. The device may also include a memory to store the captured image.

In another aspect, the stereoscopic display may be configured to display the image to be captured by the camera in three dimensions such that the user perceives depth. When the processing logic has determined the correct focus for the camera, the stereoscopic display may show the icon at a perceived depth corresponding to the correct focus.

In another aspect, the processing logic may be configured to select an object to bring into focus. The perceived depth corresponding to the correct focus may include the perceived depth of an image of the selected object.

In another aspect, the icon may include a frame that frames the image of the selected object.

In another aspect, the camera may include a first camera to capture a first image and a second camera to capture a second image. The image to be captured may include the first image and the second image.

In another aspect, the stereoscopic display may include a surface. The stereoscopic display may be configured to display the image to be captured by the camera in two dimensions. When the processing logic has determined the correct focus for the camera, the stereoscopic display may show the icon at a perceived depth corresponding to the surface of the display.

In another aspect, the processing logic may be configured to select an object to bring into focus. The icon may include a frame, wherein the frame may frame the image of the selected object.

In another aspect, a method includes stereoscopically displaying an image to be captured by a camera in three dimensions such that the user perceives depth. The method may also include automatically determining a correct focus for the camera. The method may also include stereoscopically displaying an icon at a perceived depth corresponding to the correct focus when the processing logic has determined the correct focus for the camera. The method may also include capturing the image and storing the image in a memory.

In another aspect, the method may also include stereoscopically displaying the icon moving from a first perceived depth to a second perceived depth on the image when determining the correct focus.

In another aspect, the method may also include selecting an object to bring into focus, wherein the perceived depth corresponding to the correct focus may include the perceived depth of an image of the selected object.

In another aspect, displaying the icon may include displaying a frame that frames the image of the selected object.

In another aspect, the camera may include a first camera and a second camera. Capturing the image may include capturing a first image with the first camera and capturing a second image with the second camera.

In another aspect, the stereoscopic display may include a surface. The method may include displaying the image to be captured by the camera in two dimensions. The method may also include displaying the icon at a perceived depth corresponding to the surface of the display when the correct focus for the camera has been determined.

In another aspect, the method may include selecting an object to bring into focus. Displaying the icon may include displaying a frame that frames the image of the selected object.

In another aspect, a computer-readable medium may include computer-executable instructions. The instructions may include instructions to display an image to be captured by a camera, instructions to automatically determine a correct focus for the camera, instructions to stereoscopically display the icon moving from a first perceived depth to a second perceived depth on the image when determining the correct focus, and instructions to capture the image and store the image in a memory.

In another aspect, the computer-readable medium may include instructions to stereoscopically display the image to be captured in three dimensions such that the user perceives depth. The computer-readable medium may include instructions to stereoscopically display the icon at a perceived depth corresponding to the correct focus when the correct focus for the camera has been determined.

In another aspect, the computer-readable medium may include to select an object to bring into focus. The perceived depth corresponding to the correct focus may include the perceived depth of an image of the selected object.

In another aspect, the instructions for displaying the icon may include instructions to display a frame that frames the image of the selected object.

In another aspect, the instructions to capture the image may include instructions to capture a first image with a first camera and to capture a second image with a second camera.

In another aspect, the stereoscopic display may include a surface. The computer-readable medium may include instructions to display the image to be captured by the camera in two dimensions. The computer-readable medium may also include instructions to display the icon at a perceived depth corresponding to the surface of the display when the correct focus for the camera has been determined.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 1 is a diagram of an exemplary environment in which embodiments described herein may be implemented;

FIGS. 2A and 2B are front and rear views, respectively, of a user device that may be used with embodiments described herein;

FIGS. 3A-3F illustrate a stereoscopic display as perceived by a user;

FIGS. 7A-7C illustrate a stereoscopic display, as perceived by a user, showing an autofocus frame with a two-dimensional image;

DETAILED DESCRIPTION

Figure 4:
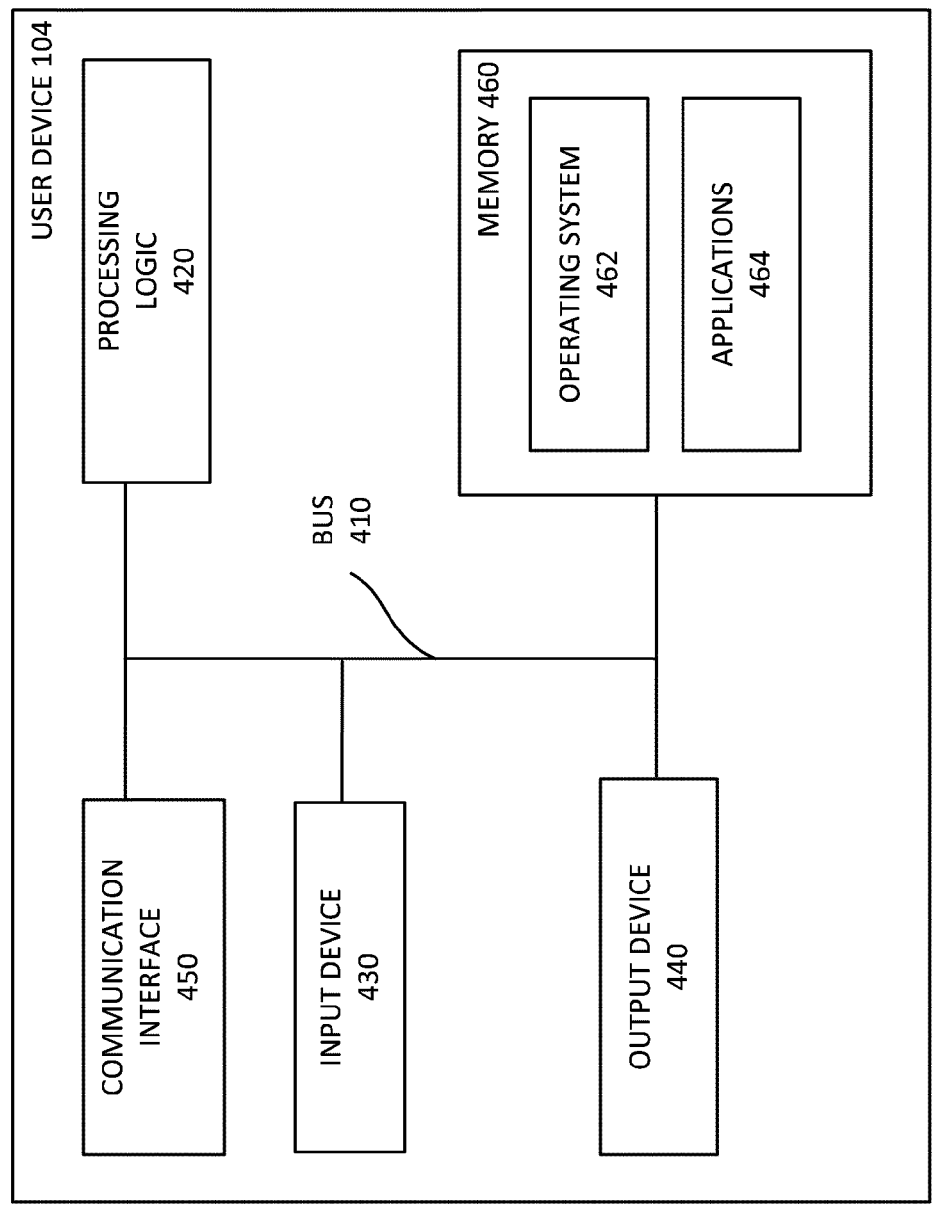
FIG. 4 is a block diagram of exemplary components of the user device in FIGS. 2A and 2B.

The following detailed description refers to the accompanying drawings. The same reference numbers in different drawings may identify the same or similar elements.

FIG, 1 is a diagram of an exemplary environment 100 in which embodiments described herein may he implemented. Environment 100 includes a user 102 of a camera 104 (also referred to as user device 104) taking a picture of objects 106 and 108 (e.g., a woman and a flower, respectively). A display 204 in camera 104 may show the objects as an image on display 204, and the image on display 204 may include an image of object 106 (e.g., the woman) and an image of object 108 (the flower). In one embodiment, display 204 may show a three-dimensional image using, for example, a stereoscopic or autostereoscopic display. That is, the image displayed by display 104 may appear to have depth to user 102.

In one embodiment, display 104 may show an autofocus frame 112 with the image. In this embodiment, autofocus frame 112 may indicate to user 102 that an autofocus process is being performed by camera 104. For example, autofocus frame 112 may change colors or may move within display 204 to indicate that camera 104 is performing the autofocus process. In one embodiment, autofocus frame 112 may appear to move toward user 102 and/or away from user 102 (e.g., change depth). Autofocus frame 112 may also indicate to user 102 when the autofocus process is complete. For example, in one embodiment, autofocus frame 112 may stop moving when the autofocus process is complete. In this embodiment, autofocus frame 112 may stop moving and appear to be on the surface of display 204. In another embodiment, autofocus frame 112 may stop moving and appear to rest on an object in the image, such as object 106.

FIGS. 2A and 2B are front and rear views, respectively, of user device 104 that may be used with embodiments described herein. Although device 104 may be depicted and described as a camera or a mobile phone, device 104 may include any of the following devices: a desktop, laptop, notebook, netbook, or personal computer; a personal digital assistant (PDA); a gaming device or console; a personal music playing (PMP) device; a Global Positioning System (GPS) device; or another type of computational or communication device.

As shown in FIG. 2, device 104 may include a speaker 202, a display 204, control keys 206, a keypad 208, a shutter button 210, a microphone 212, a first camera 214-1, a second camera 214-2 (collectively referred to as "cameras 214"), a sensor 216, a flash 218, and a housing 220. Speaker 202 may provide audible information to the user of device 104. For example, speaker 202 may output the voice of a person with whom the user of device 104 is having a conversation. Speaker 202 may also output a click when first camera 214-1 and/or second camera 214-2 captures an image.

Control keys 206 may permit the user to interact with device 104 to cause it to perform one or more operations, such as place or receive a telephone call. Keypad 208 may include a numeric, alphanumeric, and/or telephone keypad. Microphone 210 may receive sound, e.g., the user's voice during a telephone call. Shutter button 210 may permit the user to capture an image with first camera 214-1 and/or second camera 214-2. Shutter button 210 may also permit the user to begin an autofocus process before capturing an image with first camera 214-1 and/or second camera 214-2. Sensor 216 may collect information (e.g., acoustic, infrared, etc.) used for capturing images or for providing other types of information (e.g., the distance between an object and device 104). Flash 218 may illuminate an area or object while, for example, first camera 214-1 and/or second camera 214-2 capture an image.

Display 204 may provide visual information to the user, such as the image of a caller, text, menus, video images, or pictures. Display 204 may show the image being captured (or to be captured) by camera 214-1 and/or camera 214-2. Display 204 may include a two-dimensional (2D) or a three-dimensional (3D) display. For example, display 204 may include a stereoscopic and/or an autostereoscopic display for displaying 3D images or video to the user. While a stereoscopic display may require headgear or glasses, an autostereoscopic display does not. With an autostereoscopic display, if the user positions his head in a certain spot relative to display 204, the user may perceive a different image with each eye, thus providing a stereo (e.g., 3D) image and the perception of depth. As the term is used herein, a "stereoscopic display" means any display that is capable of presenting a different image to a user's eyes so that the user perceives three dimensions and/or depth. One type of stereoscopic display is an autostereoscopic display. Although a stereoscopic display is capable of showing an image in three dimensions, the stereoscopic display may show an image in two dimensions by presenting identical images to each of the user's eyes.

First camera 214-1 and second camera 214-2 may each capture an image. First camera 214-1 and second camera 214-2 may be referred to as "camera 214." First camera 214-1 and second camera 214-2 may each include a lens assembly that may focus on objects in a field of view. Because cameras 214 are spaced apart, each captured image may be slightly different. Display 204 may show these slightly different images stereoscopically, for example, giving the user the illusion of a 3D image and/or depth.

FIGS. 3A-3F illustrate a stereoscopic display (e.g., display 204) as perceived by a user. FIGS. 3A-3F use a 3D coordinate system to describe exemplary 3D images that a user may perceive when viewing display 204. This 3D coordinate system (including x, y, and z axes) is defined in FIG. 2A on display 204. As shown in FIG. 2A, the surface of display 204 resides in the plane defined by the x and y axes. The z axis is normal to and points outward from display 204. When user device 104 shown in FIG. 2A is rotated ninety degrees counter-clockwise such that shutter button 210 is on the upper-right hand corner, then the origin of the coordinate system is in the lower left hand corner of display 204. This orientation of user device 104 is assumed in the following examples.

In the examples of FIGS. 3A-3F, display 204 (e.g., a stereoscopic display in the plane of the x and y axes) shows an object 108 (e.g., a flower). As shown in FIGS. 3A and 3B, object 108 is displayed such that, from the perspective of user 102, object 108 appears to coincide with the surface of display 204 (e.g., be in the plane defined by the x and y axes). As shown in FIGS. 3C and 3D, object 108 may be displayed such that, from the perspective of user 102, object 108 appears to be in front of the surface of display 204 (e.g., by a distance d1 in front of the plane defined by the x and y axes). As shown in FIGS. 3E and 3F, object 108 may be displayed such that, from the perspective of user 102, object 108 appears to be behind the surface of display 204 (e.g., a distance d2 behind the plane defined by the x and y axes).

FIG. 4 is a block diagram of exemplary components of user device 104. User device 104 may include a bus 410, processing logic 420, an input device 430, an output device 440, a communication interface 450, and a memory 460. User device 104 may include additional, fewer, or different components than the ones illustrated in FIG. 4 that aid in receiving, transmitting, and/or processing data. Moreover, other configurations of components in user device 104 are possible.

Bus 410 may include a path that permits communication among the components of user device 104. Processing logic 420 may include any type of processor or microprocessor (or groups of processors or microprocessors) that interprets and executes instructions. In other embodiments, processing logic 420 may include one or more application-specific integrated circuits (ASICs) or field-programmable gate arrays (FPGAs).

Input device 430 may permit a user to input information into user device 104, such as a sensor (e.g., sensor 216), a keyboard (e.g., control keys 206, keypad 208, or shutter button 210), a mouse, a pen, a microphone (e.g., microphone 212), a camera (e.g., first camera 214-1 or second camera 214-2), a touch-screen display (e.g., display 204), etc. Output device 440 may output information to the user and may include a display (e.g., display 204), a speaker (e.g., speaker 202), etc. Input device 430 and output device 440 may allow the user to receive and view a menu of options and select from the menu options, The menu may allow the user to select the functions or services associated with applications or software executed by user device 104.

Communication interface 450 may include a transceiver that enables user device 104 to communicate with other devices or systems. Communications interface 450 may include a network interface card, e.g., Ethernet card, for wired communications or a wireless network interface (e.g., a WiFi) card for wireless communications. Communication interface 450 may implement a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), LTE (Long Term Evolution), etc. Communication interface 450 may also include, for example, a universal serial bus (USB) port for communications over a cable, a Bluetooth™ wireless interface for communicating with Bluetooth devices, a near-field communication (NFC) interface, etc.

Memory 460 may include a computer-readable medium, which may include a physical or logical memory device. Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; or some other type of magnetic or optical recording medium and its corresponding drive, e.g., a hard disk drive (HDD), a solid state drive (SSD) or memory, for storing information and/or instructions.

Memory 460 may also include an operating system 462 and applications 464. Operating system 462 may include software instructions for managing hardware and software resources of user device 104. Operating system 462 may include Symbian, Android, Windows Mobile, etc. Applications 464 may provide services to the user, such as, for example, a browser for browsing the Internet or a camera application for taking pictures, e.g., via camera 214.

Figure 5:
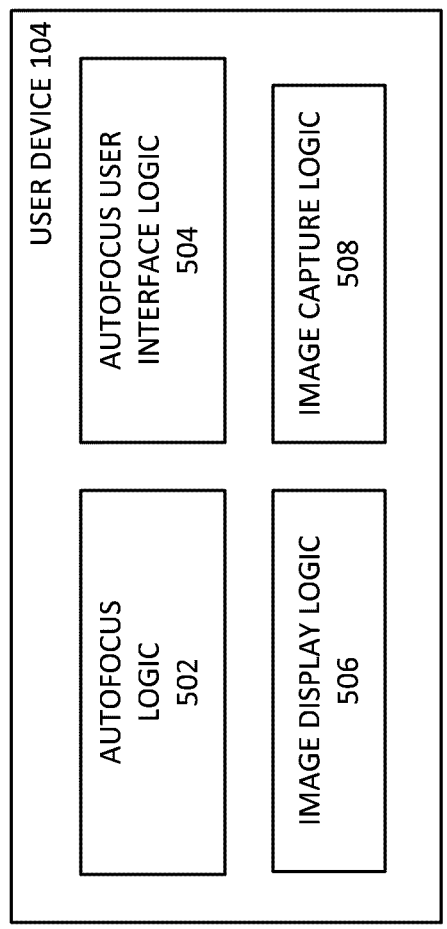
FIG. 5 is a block diagram of exemplary functional components of the user device in FIGS. 2A and 2B.

FIG. 5 is a block diagram of exemplary functional components of user device 104. As shown, user device 104 may include autofocus logic 502, autofocus user interface (UI) logic 504, image display logic 506, and image capture logic 508. User device 104 may include additional, fewer, or different functional components than those illustrated in FIG. 5. For example, in one implementation, user device 104 may include video capture logic or video display logic.

User device 104 may perform these functions and other functions, operations, or processes in response to processing logic 420 executing software instructions stored in a computer-readable medium, such as memory 460. The software instructions may be read into memory 460 from another computer-readable medium or from another device via communication interface 450. The software instructions in memory 460 may cause processing logic 420 to perform processes that are described herein.

Autofocus logic 502 may use one or more sensors (e.g., sensor 216) to determine the correct focus to capture an image of an object (the "focused object") in front of first camera 214-1 and/or second camera 214-2. Autofocus logic 502 may select the focused object among many objects in the field of view of camera 214. Autofocus logic 502 may also select more than one focused objects, e.g., more than one object to be focused. Autofocus logic 502 may determine the correct focus over a period of time (e.g., between 0.7 and 1.2 seconds). Autofocus logic 502 may start its determination, for example, when a user presses shutter button 210 and may continue until completion, e.g., until the correct focus is determined. In one embodiment, autofocus logic 502 may include face detection logic. In this embodiment, face detection logic may allow autofocus logic 502 to determine the correct focus so that a face in an image is correctly focused.

Image capture logic 508 may use the autofocus information from autofocus logic 502 to focus first camera 214-1 and/or second camera 214-2 and capture an image. Image display logic 506 may prepare image data (e.g., data captured by first camera 214-1 and/or second camera 214-2) for display on display 204. In one embodiment, image display logic 506 may prepare, in a stereoscopic manner, both images being captured by first camera 214-1 and second camera 214-2.

Autofocus UI logic 504 may indicate to the user that autofocus logic 502 is in the process of determining the correct focus. Such an indication may alleviate a user's frustration during the time between when the user wishes to capture an image until the time autofocus logic 502 has completed the autofocus process and determined the correct focus. For example, in one embodiment, autofocus UI logic 504 may display an icon (e.g., an autofocus frame such as AF frame 112) that moves to indicate to the user that autofocus logic 502 is performing an autofocus process. Autofocus UI logic 504 may also indicate to the user when autofocus logic 502 has completed and determined the correct focus. For example, in one embodiment, autofocus UI logic 504 may display an icon (e.g., an autofocus frame such as AF frame 112) that stops moving to indicate to the user that autofocus logic 502 has completed the autofocus process.

In one embodiment, autofocus UI logic 502 may display an icon (e.g., an autofocus frame such as AF frame 112) with the image on display 204 to indicate (e.g., "frame") an area, volume, or object that autofocus logic 502 has selected for determining the correct focus. For example, referring to FIG. 1, AF frame 112 may indicate that autofocus logic 502 is using the woman's face (e.g., object 106) for determining the correct focus.

FIGS. 6A-6D and 7A-7C demonstrate how the components and functional components of user device 104 may operate according to one or more embodiments. FIGS. 6A-6D are diagrams that illustrate an autofocus frame 602 in a stereoscopic display as perceived by user 102. FIGS. 6A-6D use the same 3D coordinate system described above with respect to FIGS. 2A and 3A-3F, where the x and y axes define the surface of stereoscopic display 204 and the z axis is normal to and points outward from display 204. In the examples of FIGS. 6A-6D, display 204 shows an image including an object image 606 (e.g., an image of a woman) and an object image 608 (e.g., an image of a flower). In this example, object image 606 may correspond to object 106 in FIG. 1 and object image 608 may correspond to object 108 in FIG. 1. That is, images 606 and 608 are the displayed representations of actual objects 106 and 108 in environment 100. In other words, objects 106 and 108 in environment 100 may be displayed as 3D object images 606 and 608 on stereoscopic display 204.

Figure 6A:
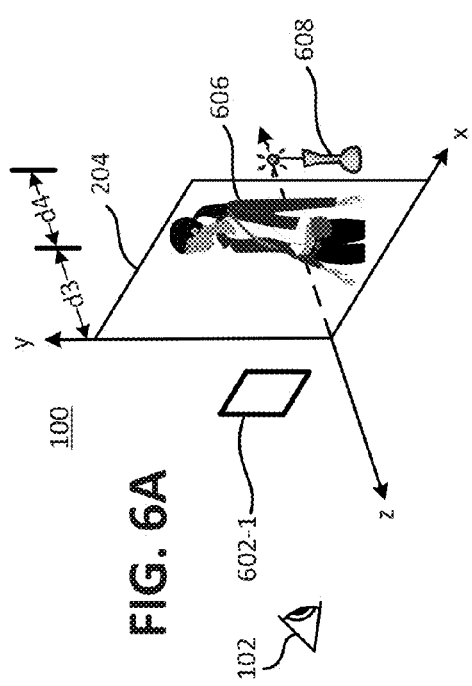
FIGS. 6A-6D illustrate a stereoscopic display, as perceived by a user, showing an autofocus frame with a three-dimensional image.
Figure 6B:
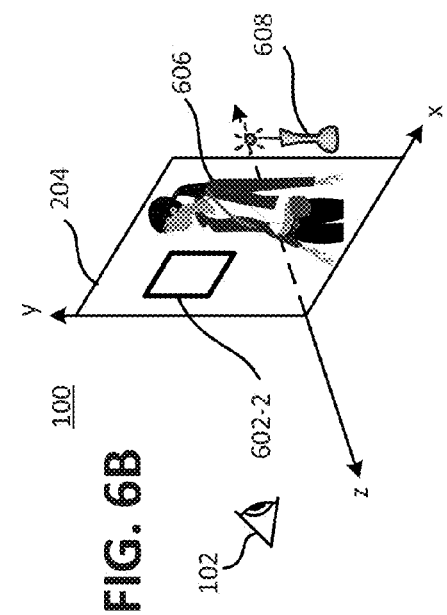
Figure 6C:
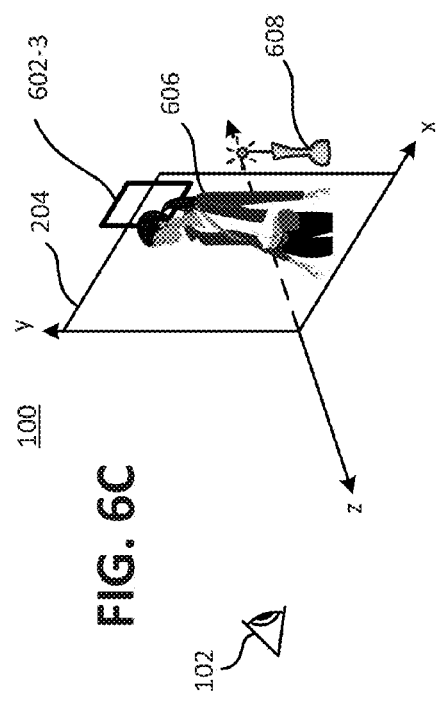
Figure 6D:
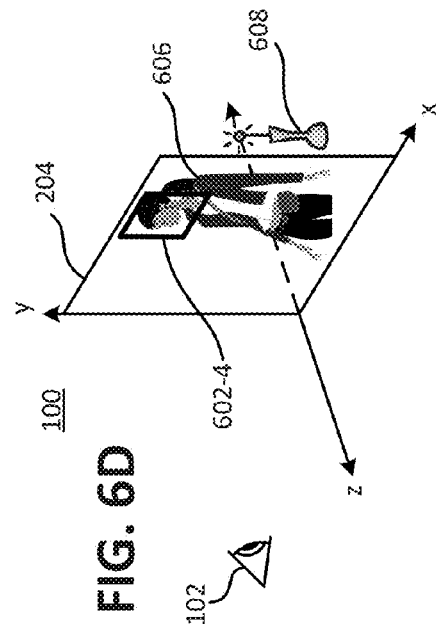

As shown in FIGS. 6A-6D, object image 606 is displayed such that, from the perspective of user 102, object image 606 appears to be behind the surface of display 204 (e.g., a distance d3 behind the plane defined by the x and y axes) and object image 608 appears to be behind object image 606 (e.g., a distance d4 behind object image 606). As shown in FIG. 6A, AF frame 602-1 appears to be in front of the surface of display 204 (e.g., in front of the plane defined by the x and y axes). As shown in FIG. 6B, AF frame 602-2 may be displayed such that, from the perspective of user 102, AF frame 602-2 appears to coincide with the surface of display 204 (e.g., be in the plane defined by the x and y axes). As shown in FIG. 6C, AF frame 602-3 may be displayed such that, from the perspective of user 102, AF frame 602-3 appears to be behind the surface of display 204 (e.g., behind the plane defined by the x and y axes) and behind object image 606. As shown in FIG. 6D, AF frame 602-4 may appear to user 102 to coincide with object image 606 (e.g., a distance d3 behind display 204). Collectively AF frame 602-1 through 602-4 may be referred to as AF frame 602.

In one embodiment, user device 104 may only include a single camera (e.g., first camera 214-1). In this embodiment, user device 104 may capture and display 2D images on display 204 even though display 204 may be a stereoscopic display. Or, the user of user device 104 may request the capture of a 2D image even though user device 104 may include two cameras (e.g., first camera 214-1 and second camera 214-2) and a stereoscopic display 204.

In the examples of FIGS. 7A-7C, display 204 shows an object image 706 (e.g., an image of a woman) and an object image 708 (e.g., an image of a flower) in 2D. In this example, object image 706 may correspond to object 106 in FIG. 1 and object image 708 may correspond to object 108 in FIG. 1. That is, images 706 and 708 are the displayed representations of actual objects 106 and 108 in environment 100. As shown in FIGS. 7A-7C, object image 706 and object image 708 are displayed such that, from the perspective of user 102, both object images 706 and 708 appear to coincide with the surface of display 204 (e.g., at the plane defined by the x and y axes). In other words, environment 100 may be displayed as a 2D image on display 204, even though display 204 may be a stereoscopic display.

As shown in FIG. 7A, AF frame 702-1 may be displayed such that, from the perspective of user 102, AF frame 702-1 appears to be in front of the surface of display 204 (e.g., in front of the plane defined by the x and y axes). As shown in FIG. 7B, AF frame 702-2 may be displayed such that, from the perspective of user 102, AF frame 702-2 appears to coincide with the surface of display 204 (e.g., be in the plane defined by the x and y axes) and to coincide with object images 706 and 708. As shown in FIG. 7C, AF frame 702-3 may be displayed such that, from the perspective of user 102, AF frame 702-3 appears to be behind the surface of display 204 (e.g., behind the plane defined by the x and y axes) and behind image objects 706 and 708. Collectively AF frame 702-1 through 702-3 may be referred to as AF frame 702.

In one embodiment, user device 104 may display an AF frame (e.g., AF frames 602 or 702) to indicate that user device 104 is performing an autofocus process to determine the correct focus. In this embodiment, user device 104 may move the AF frame on display 204 to show that user device 104 is performing the autofocus process. For example, user device 104 may move AF frame 602 (e.g., in a continuous manner) between the positions shown in FIGS. 6A-6D. As another example, user device 104 may move AF frame 702 (e.g., in a continuous manner) between the positions shown in FIGS. 7A-7C. Thus, in these embodiments, AF frame 602 or AF frame 702 may appear to move from in front of display 204 to behind display 204 and back again.

In one embodiment, user device 104 may indicate that the autofocus process has been completed by positioning the autofocus frame on the object image (e.g., at the perceived depth of the image of the focused object) and/or at the perceived depth selected for correct focus. For example, if object 106 (corresponding to object image 606) in FIGS. 6A-6D is selected to bring into focus (e.g., is the focused object), then AF frame 602 may be positioned (e.g., may stop moving) on object image 606 (e.g., as the image of the focused object) shown in FIG. 6D with AF frame 602-4. In one embodiment, AF frame 602 may be positioned on the face of an image of a person, if the object is recognized, for example, by autofocus logic 502 as a human face. For example, AF frame 602 may be positioned on the woman's face (e.g. object image 606) as shown in FIG. 6D with AF frame 602-4.

In another embodiment, UI logic 502 and image display logic 508 may indicate that the autofocus process has been completed by positioning the AF frame to appear on the surface of the display. For example, if object 106 (corresponding to object image 706) in FIGS. 7A-7D is selected to bring into focus (e.g., is the focused object), then AF frame 702 may be positioned (e.g., may stop moving) on the surface of display 204. As another example, if object 106 (corresponding to object image 606) in FIGS. 6A-6D is selected to bring into focus, then AF frame 602 may be positioned (e.g., may stop moving) on the surface of display 204 as shown in FIG. 6B with AF frame 602-2. In one embodiment, the autofocus frame may be positioned on the face of an image of a person, if the image object is recognized by autofocus logic 502 as a human face. For example, AF frame 702 may be positioned on the woman's face (e.g. object image 706) as shown in FIG. 7B with AF frame 702-2.

In one embodiment, UI logic 504 and image display logic 508 may indicate that the autofocus process has been completed by changing the color of the autofocus frame. For example, AF frames 602 and/or 702 may change from a red color to a green color. In another embodiment, UI logic 504 and speaker 202 may indicate that the autofocus process has been completed by generating an audible sound, such as a beep, via speaker 202.

Exemplary Processes

Figure 8:
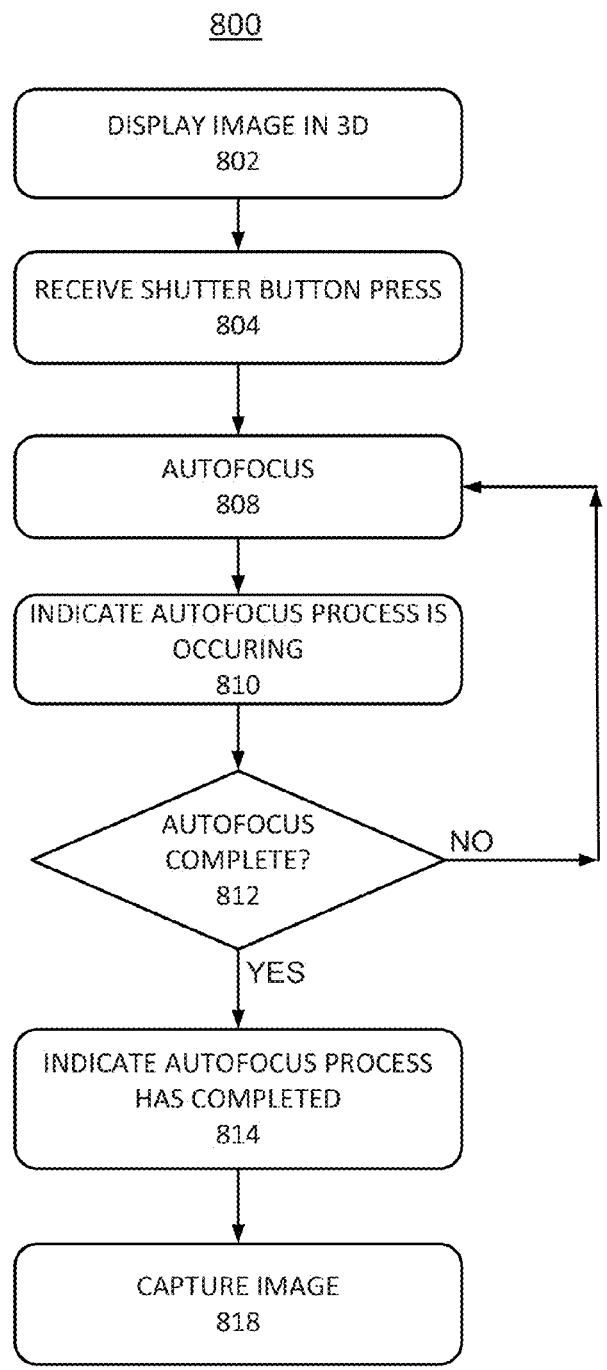
FIG. 8 is a flowchart of an exemplary process for a user interface for autofocus with a three-dimensional image.

FIG. 8 is a flowchart of an exemplary process 800 for displaying a user interface for autofocus. Process 800 may begin with user 102 pointing user device 104 toward an object 106 (e.g., a woman) in environment 100 (including object 108) to capture an image. The image (e.g., of environment 100) may be displayed in 3D (block 802). In the following example, first camera 214-1 and second camera 214-2 may be directed to environment 100 in FIG. 1 and display 204 may display images in 3D.

Figure 9:
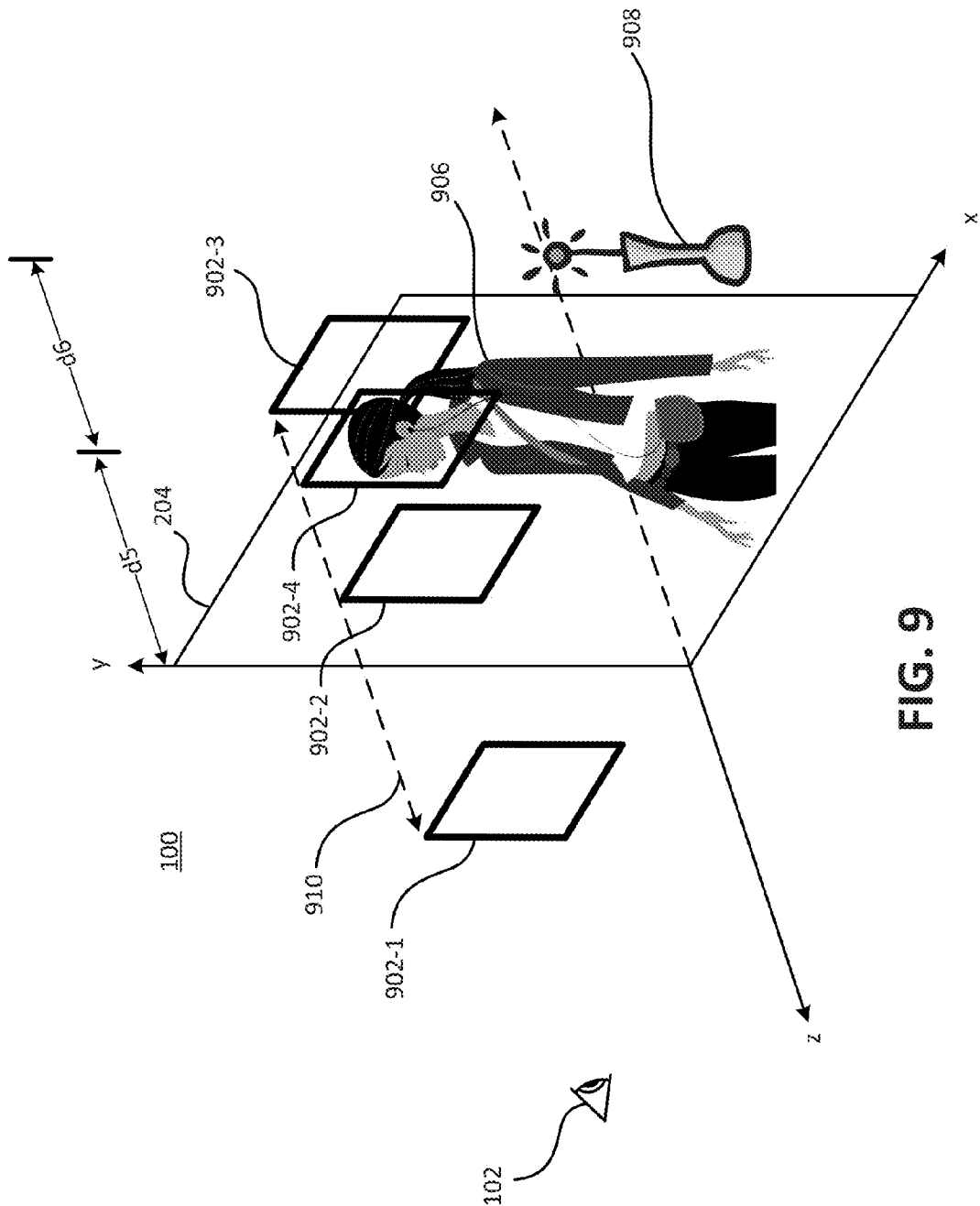
FIG. 9 illustrates a stereoscopic display, as perceived by a user, showing a user interface for autofocus with a three-dimensional image.

As shown in FIG. 9, image display logic 506 may display an object image 906 (e.g., an image of a woman) and an object image 908 (e.g., an image of a flower) on display 204. In this example, object image 906 may correspond to object 106 and object image 908 may correspond to object 108 in FIG. 1. That is, images 906 and 908 are the displayed representations of actual objects 106 and 108 in environment 100. In other words, objects 106 and 108 in environment 100 may be displayed as 3D object images 906 and 908 on stereoscopic display 204. As shown in FIG. 9, object image 906 is displayed such that, from the perspective of user 102, object image 906 appears to be behind the surface of display 204 (e.g., a distance d5 behind the plane defined by the x and y axes) and object image 908 appears to be behind object image 906 (e.g., a distance d6 behind object image 906).

The shutter button may be pressed (block 804). For example, user 102 may press shutter button 210 on user device 104. The camera may perform autofocus (block 808). Before image capture logic 508 captures an image, and/or in response to shutter button 210 being pressed, autofocus logic 502 may perform an autofocus process to determine the correct focus. The autofocus process may take a period of time (e.g., 0.7 to 1.2 seconds). An indication may be given to the user that the autofocus process is occurring (block 810). Such an indication may alleviate user frustration during the time between when the user wishes to capture an image until the time autofocus logic 502 has completed the autofocus process and determined the correct focus. For example, autofocus UI logic 504 may display an icon (e.g., AF frames 902-1, 902-2, 902-3, or 903-4, collectively known as AF frame 902) on display 204. In one embodiment, autofocus UI logic 504 may move the icon (e.g., AF frame 902). As shown in FIG. 9, in one embodiment, AF frame 902 may move forward (e.g., toward user 102) and backward (e.g., away from user 102) in the directions of arrows 910. For example, AF frame 902 may first appear to user 102 as AF frame 902-1 in front of display 204. AF frame 902 may then move to appear as AF frame 902-2 on the surface of display 204. AF frame 902 may then move to appear as AF frame 902-3 behind display 204 and behind object image 906. In one embodiment, the movement of AF frame 902 between these positions may appear to be continuous or near continuous. In another embodiment, the movement may appear to be discontinuous.

In the example of FIG. 9, autofocus logic 502 has selected object image 906 to bring into focus (e.g., object 106 is the focused object). As shown, autofocus logic 502 may also use face recognition logic to recognize a face of object image 906 (e.g., the face of the woman). AF frame 902 may also show the image object, area, or volume being used by autofocus logic 502 for the autofocus process to determine the correct focus. For example, the area defined by AF frame 902-4 indicates the area that autofocus logic 502 may use to determine the correct focus. AF frames 902-1, 902-2, 902-4, and 902-3 may also define the volume that autofocus logic 502 may use to determine the correct focus.

If autofocus is not complete (block 812: NO), then the autofocus process may continue (block 808) and the icon may continue to be moved (block 810). For example, AF frame 902 may continue to move (e.g., forward and back again) between the positions shown in FIG. 9. If autofocus is complete (block 812: YES), an indication may be given to indicate that the autofocus has been completed (block 814). For example, an indication may be given by stopping the autofocus frame at the object image corresponding to the selected object to be focused (e.g., the focused object). In other words, the autofocus frame may appear at the depth in the 3D image corresponding to the depth of the image of the focused object. As shown in FIG. 9, AF frame 902 may stop moving and come to a rest in the position to appear as AF frame 902-4, at a distance d5 behind display 204 that corresponds to the depth of object image 906. An indication may also be given by generating a sound or changing the color of AF frame 902 (e.g., from red to green).

An image may be captured (block 818). Using the focus information gathered during block 808 from autofocus logic 502, image capture logic 508 (e.g., using first camera 214-1 and second camera 214-2) may capture a focused image, for example.

Figure 10:
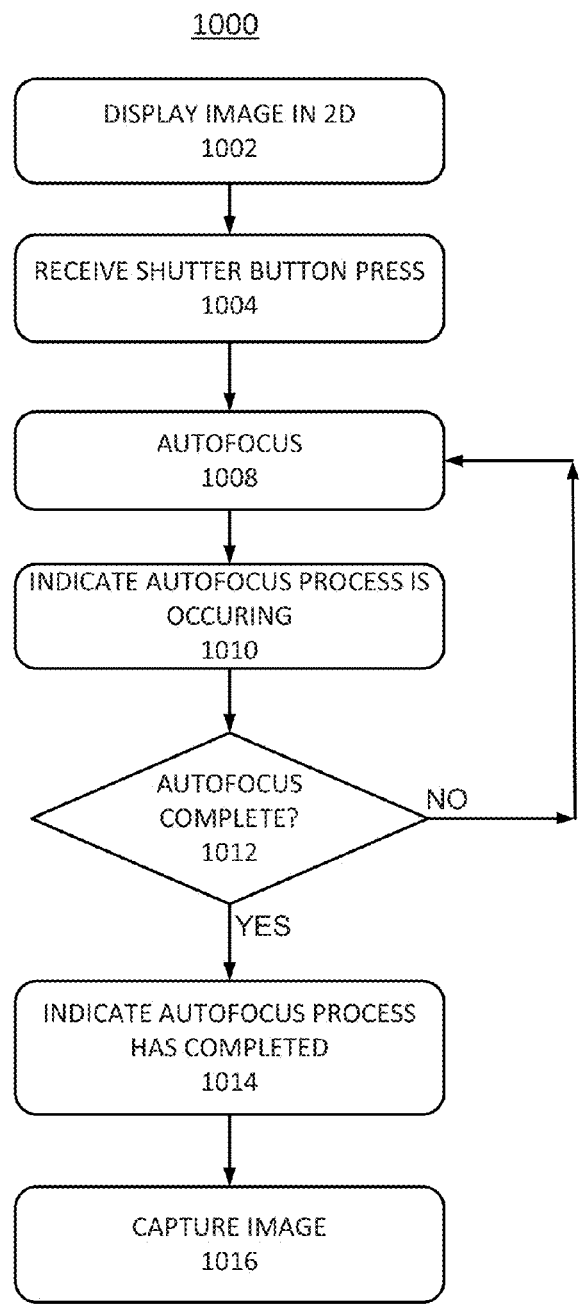
FIG. 10 is a flowchart of an exemplary process for a user interface for autofocus with a two-dimensional image.

In the example above, a 3D image was displayed on display 204 in process block 802. As discussed above, however, user device 104 may include a single camera (rather than two cameras for a stereoscopic display) or user 102 may request that user device 104 capture and/or display a 2D image rather than a 3D image, for example. FIG. 10 is a flowchart of an exemplary process 1000 for displaying a user interface for autofocus while displaying a 2D image.

Figure 11:
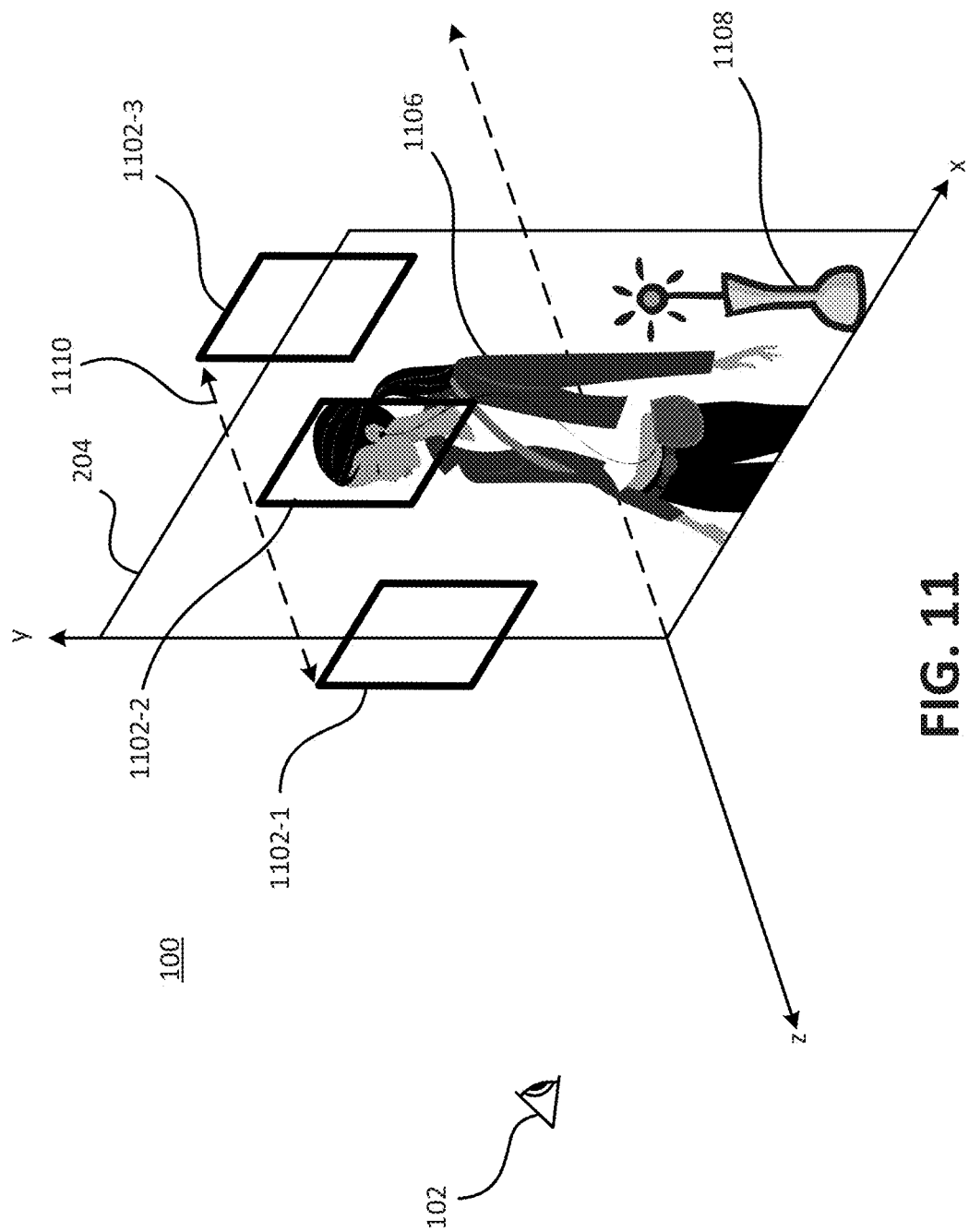
FIG. 11 illustrates a stereoscopic display, as perceived by a user, showing a user interface for autofocus with a two-dimensional image.

Like process 800, process 1000 may begin with user 102 pointing user device 104 toward an object 106 (e.g., a woman) in environment 100 (including object 108) to capture an image. The image of environment 100) may be displayed in 2D (block 1002). For example, first camera 214-1 may be directed to environment 100 in FIG. 1. As shown in FIG. 11, objects 106 and 108 in environment 100 may be displayed as 2D object images 1106 and 1108 on stereoscopic display 204. In this example, object image 1106 and object image 1108 are displayed such that, from the perspective of user 102, both object images 1106 and 1108 appear to coincide with the surface of display 204 (e.g., at the plane defined by the x and y axes). In other words, environment 100 may be displayed as a 2D image on display 204, even though display 204 may be a stereoscopic display.

The shutter button may be pressed (block 1004). For example, user 102 may press shutter button 210 on user device 104. The camera may perform autofocus (block 1008). Before image capture logic 508 captures an image, and/or in response to shutter button 210 being pressed, autofocus logic 502 may perform an autofocus process to determine the correct focus. An indication may be given to the user that the autofocus process is occurring (block 1010). For example, display 204 may display an icon (e.g., AF frames 1102-1, 1102-2, or 1102-3). In one embodiment, autofocus UI logic 504 may move the icon (e.g., AF frame 1102). As shown in FIG. 11, in one embodiment, AF frame 1102 may move forward (e.g., toward user 102) and backward (e.g., away from user 102) in the directions of arrows 1110. For example, AF frame 1102 may first appear to user 102 as AF frame 1102-1 in front of display 204. AF frame 1102 may then move to appear as AF frame 1102-2 on the surface of display 204. AF frame 1102 may then move to appear as AF frame 1102-3 behind display 204 and behind object image 1106. In one embodiment, the movement of AF frame 1102 between these positions may appear to be continuous or near continuous. In another embodiment, the movement may appear to be discontinuous.

AF frame 1102 may also show the object image, area, or volume being used by autofocus logic 502 for the autofocus process to determine the correct focus. For example, the area defined by AF frame 1102-3 indicates the area that autofocus logic 502 may use to determine the correct focus. AF frames 1102-1, 1102-2, and 1102-3 may also define the volume that autofocus logic 502 may use to determine the correct focus.

If autofocus is not complete (block 1012: NO), then the autofocus process may continue (block 1008) and, in one embodiment, the icon may continue to be moved. For example, AF frame 1102 may continue to move (e.g., forward and back again) between the positions shown in FIG. 11. If autofocus is complete (block 1012: YES), an indication may be given to indicate that the autofocus process has been completed (block 1014). For example, an indication may be given by stopping the icon (e.g., the autofocus frame) on the surface of display 204. As shown in FIG. 11, AF frame 1102 may stop moving and come to a rest in the position to appear as AF frame 1102-3 on the surface of display 204. To user 102, AF frame 1102-3 appearing at the surface of display 204 also appears at the same depth as object image 1106. An indication may also be given by generating a sound or changing the color of AF frame 1102 (e.g., from red to green).

An image may be captured (block 1016). Using the focus information gathered during block 1008 from autofocus logic 502, image capture logic 508 (e.g., using first camera 214-1 or second camera 214-2) may capture a focused image, for example.

Conclusion

The foregoing description of implementations provides illustration, but is not intended to be exhaustive or to limit the implementations to the precise form disclosed. Modifications and variations are possible in light of the above teachings or may be acquired from practice of the teachings.

For example, although the specification may refer to images being captured by the user device, the same principles and embodiments may apply to the user device capturing video. Further, although the specification may refer to autofocus, the same principles and embodiments may apply to manual or partially manual focusing.

Additionally, while series of blocks have been described with regard to the exemplary processes 800 and 1000, the order of the blocks may be modified in other implementations. In addition, non-dependent blocks may represent acts that can be performed in parallel to other blocks.

Aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

The term "comprises/comprising," as used herein, specifies the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:

a camera including a lens assembly;

an autostereoscopic display to display an image to be captured by the camera;

at least one processor to perform an autofocus, of the camera, using a framed volume that is indicated with respect to a selected object in the image, wherein the autostereoscopic display is to:

indicate, to a user of the device that the autofocus is occurring, by presenting a first icon on the image and appearing to move perpendicularly on the selected object, relative to a second icon on the image at a first plane corresponding to a viewing surface of the autostereoscopic display, to different perceived depths to define the framed volume, including a first perceived depth, corresponding to a second plane parallel to the first plane and located between the viewing surface and the user, and indicate, to the user that the autofocus is complete by stopping the first icon at a second perceived depth, corresponding to a third plane parallel to the first plane, wherein the third plane is located at the viewing surface or at an image of the selected object appearing at a distance from the viewing surface; and a memory to store the captured image.

2. The device of claim 1, wherein the autostereoscopic display displays the image in three dimensions.

3. The device of claim 2, wherein the at least one processor is further configured to:
  select the selected object, from multiple objects within a field of view of the camera, to bring into focus, wherein at least two of the multiple objects are at different distances from the camera.

4. The device of claim 1, wherein the camera includes a first camera to capture a first image and a second camera to capture a second image, and
  wherein the image to be captured includes the first image and the second image.

5. The device of claim 1, wherein the autostereoscopic display displays the image in two dimensions, and
  wherein, when the autofocus is complete, the autostereoscopic display shows the first icon at a perceived depth in the third plane corresponding to the viewing surface of the autostereoscopic display.

6. The device of claim 5, wherein the at least one processor selects the selected object, from multiple objects within a field of view of the camera, to bring into focus, and wherein at least two of the multiple objects are at different distances from the camera.

7. A method comprising:
  displaying, by an autostereoscopic display of a device, an image, to be captured by a camera of the device, in three dimensions such that a user perceives depth of the image via a display associated with the camera;
  performing, by at least one processor of the device, autofocus of the camera using a framed volume that is indicated with respect to a selected object in the image;
  indicating, to a user of the device that the autofocus is occurring, by displaying a first icon appearing to move perpendicularly on the selected object, relative to a second icon on the image at a first plane corresponding to a viewing surface of the display, from different perceived depths corresponding to different planes parallel to the first plane to define the framed volume, wherein at least one of the different planes is located between the viewing surface and the user;
  indicating, to the user that the autofocus is complete, by displaying the first icon at rest at a perceived depth corresponding to the first plane or to an image of the selected object at a distance from the viewing surface; and
  capturing and storing the image in a memory.

8. The method of claim 7, further comprising:
  displaying the first icon moving from a first perceived depth on the image, at a second plane in front of the first plane, to a second perceived depth on the image, at a third plane behind the first plane, when performing the autofocus.

9. The method of claim 7, further comprising:
  selecting the selected object, of multiple objects within a field of view of the camera, to bring into focus, wherein at least two of the multiple objects are at different distances from the camera.

10. The method of claim 7, wherein the camera includes a first camera and a second camera, wherein capturing the image includes capturing a first image with the first camera and capturing a second image with the second camera.

11. The method of claim 7, further comprising:
  displaying the image to be captured by the camera in two dimensions; and
  displaying the first icon at a perceived depth corresponding to the surface of the display when the autofocus is complete.

12. The method of claim 7, further comprising:
  selecting the selected object, of multiple objects within a field of view of the camera, to bring into focus, wherein at least two of the multiple objects are at different distances from the camera.

13. A non-transitory computer-readable medium including computer-executable instructions, the instructions comprising:
  one or more instructions to display an image, to be captured by a camera, via a display associated with the camera;
  one or more instructions to use multiple icons, associated with performing an autofocus of the camera, to indicate a framed volume with respect to a selected object in the image;
  one or more instructions to:
  indicate, to a user of the device that the autofocus is occurring, by representing a first icon to be moving perpendicularly on the selected object, relative to a second icon on the image at a first plane corresponding to a viewing surface of the display, to different perceived depths to define the framed volume, including a first perceived depth on the image, corresponding to a second plane parallel to the first plane and located between the viewing surface and the user, and
  indicate, to the user that the autofocus is complete, by positioning the first icon at a second perceived depth on the image, corresponding to a third plane parallel to the first plane, wherein the third plane is located at the viewing surface or at an image of the selected object appearing at a distance from the viewing surface; and
  one or more instructions to capture and store the image in a memory.

14. The non-transitory computer-readable medium of claim 13, further comprising:
  one or more instructions to autostereoscopically display the image, to be captured, in three dimensions.

15. The non-transitory computer-readable medium of claim 13, further comprising:
  one or more instructions to select the selected object, of multiple objects within a field of view of the camera, to bring into focus, wherein at least two of the multiple objects are at different distances from the camera.

16. The non-transitory computer-readable medium of claim 13, wherein the one or more instructions to capture the image includes one or more instructions to capture a first image with a first camera and to capture a second image with a second camera.

17. The non-transitory computer-readable medium of claim 13, the computer-readable memory further comprising:
  one or more instructions to display the image to be captured by the camera in two dimensions; and
  one or more instructions to display the first icon at a perceived depth in the first plane corresponding to the surface of the display when the autofocus is complete.

* * * * *